US011917022B1

(12) United States Patent
Smith et al.

(10) Patent No.: US 11,917,022 B1
(45) Date of Patent: Feb. 27, 2024

(54) CONSENT SYSTEM

(71) Applicant: Quantcast Corporation, San Francisco, CA (US)

(72) Inventors: Kevin Smith, San Francisco, CA (US); Airey Baringer, III, San Francisco, CA (US); Scott S. McCoy, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

(21) Appl. No.: 17/376,040

(22) Filed: Jul. 14, 2021

Related U.S. Application Data

(60) Provisional application No. 63/052,318, filed on Jul. 15, 2020.

(51) Int. Cl.
| | | |
|---|---|---|
| G06F 15/173 | (2006.01) | |
| H04L 67/146 | (2022.01) | |
| G06F 16/957 | (2019.01) | |
| G06F 16/955 | (2019.01) | |
| H04L 67/02 | (2022.01) | |
| H04L 67/50 | (2022.01) | |

(52) U.S. Cl.
CPC .......... *H04L 67/146* (2013.01); *G06F 16/957* (2019.01); *G06F 16/9566* (2019.01); *H04L 67/02* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 2002/0120866 | A1* | 8/2002 | Mitchell | ................. G06F 21/31 726/4 |
| 2017/0293954 | A1* | 10/2017 | Rosenberg | ......... G06Q 30/0643 |
| 2019/0253512 | A1* | 8/2019 | Meghani | ............... H04L 67/146 |
| 2020/0007530 | A1* | 1/2020 | Mohamad Abdul | ......................... H04W 12/009 |
| 2021/0336937 | A1* | 10/2021 | Gao | ...................... G06F 21/602 |

\* cited by examiner

*Primary Examiner* — Phuoc H Nguyen
(74) *Attorney, Agent, or Firm* — Andrea Wheeler

(57) ABSTRACT

A consent system enables a consumer to save consent choices so that the publisher can retrieve the consumer consent choices when the consumer visits the publisher site, without requiring the consumer to make additional selections corresponding to consent choices. The consumer can save consent choices as a consent system first party cookie or in an account at the consent system. The consumer can save consent choices when visiting a publisher site or by accessing the consent system. The publisher can retrieve the consumer consent choices from the consent system first party cookie or from the account at the consent system. Multiple publishers can retrieve the consumer consent choices saved in an account with the consent system, enabling "cross-platform consent."

21 Claims, 10 Drawing Sheets

CONSENT SYSTEM

CROSS-REFERENCE TO RELATED APPLICATION

This application claims the benefit of priority to U.S. Provisional Application No. 63/052,318, entitled "Consented ID Domain," filed Jul. 15, 2020, all of which is hereby incorporated by reference in its entirety.

BACKGROUND

When an entity, such as a browser, visits a publisher site, such as a web site, the user of the browser, such as a consumer, may be asked to make selections corresponding to privacy consent choices (i.e., "consent choices"). For example, privacy consent choices may include an option to opt-out of the use of certain cookies (e.g., targeted advertising cookies) by the publisher site. The ability to make selections corresponding to consent choices is often provided in an interactive user interface ("UI") that opens in the publisher site (i.e., a "popup" UI). The consumer consent choices may be saved as a publisher first party consent cookie in the browser. If the browser returns to the publisher site, the publisher site may be able to retrieve the consent choices from the publisher first party consent cookie without providing the popup UI and without requiring the consumer to make consent choices again.

However, the publisher site may not be able to retrieve the consent choices from the publisher first party consent cookie. For example, the publisher first party consent cookie may have been removed by the browser, such as by deleting cookies, or the publisher first party consent cookie may be expired. In this case, when the browser returns to the publisher site, the browser will be required to see the popup UI again and make selections corresponding to consent choices again.

Additionally, when the browser visits another site related to the publisher site, such as a sub-site, the second publisher site may not be able to access the first publisher first party consent cookie. In this case, the browser will be required to see the popup UI again and make selections corresponding to consent choices again.

Viewing popup UIs and/or making selections corresponding to consent choices multiple times lowers consumer satisfaction of a publisher site. Lower consumer satisfaction may cause a consumer to spend less time at a publisher site (and, for example, spend less time reading content or viewing ads), or may cause a consumer to take fewer actions at the publisher site (such as clicking on ads or purchasing items). Thus, lower consumer satisfaction may cause the publisher to earn less revenue from the consumer visiting the site.

What is needed is system, a non-transitory computer-readable storage medium, and a method for enabling the consumer to save consent choices so that the publisher can retrieve the consumer consent choices when the consumer visits the publisher site, without providing a popup UI and without requiring the consumer to make additional selections corresponding to consent choices. Advantageously, eliminating the need for the consumer to view the popup UI and make selections corresponding to consent choices raises consumer satisfaction when visiting the publisher site. Higher consumer satisfaction may cause a consumer to spend more time at a publisher site or may cause a consumer to take more actions at the publisher site. Accordingly, higher consumer satisfaction may cause the publisher to earn more revenue from the consumer visiting the publisher site.

SUMMARY

A consent system enables a consumer to save consent choices in a consent system first party cookie in the consumer's browser, which enables a publisher site to retrieve the consumer consent choices when the consumer visits the publisher site, without providing a popup UI and without requiring the consumer to make additional selections corresponding to consent choices.

The consent system enables the consumer to save consent choices in an account with the consent system, which enables a publisher site to retrieve the consumer consent choices when the consumer visits the publisher site, without providing a popup UI and without requiring the consumer to make additional consent choices.

The consent system enables the consumer to directly access their account with the consent system, to make or change their saved consent choices.

The consent system enables the manager of a publisher site to directly access the consumer consent choices saved in the consumer account with the consent system. The consent system enables the manager of a publisher site to directly access the other information saved in, or associated with, consumer consent choices saved in the consumer account with the consent system Advantageously, the consent system provides a publisher with additional options to retrieve the consumer consent choices when the consumer visits the publisher site. These options include the consent system first party consent cookie saved, for example, in the consumer's browser, and the consent choices saved in a consumer account with the consent system. Thus, a publisher can retrieve the consumer consent choices when the consumer visits the publisher site without requiring the consumer to view a popup UI and/or make additional consent choices.

Advantageously, the consent system provides a consumer multiple options to save consent choices. These options include as a consent system first party consent cookie saved in the consumer's browser and in an account with the consent system.

Advantageously, the consent system provides a consumer with multiple methods and mechanisms to save consent choices. These options include visiting a publisher site and directly accessing the consent system.

Advantageously, the consent system enables a consumer to minimize the times that they see a popup UI or make selections corresponding to consent choices.

Advantageously, the consent system enables a consumer to save consent choices a first party consent cookie, which is less likely to be deleted or blocked by a browser or publisher than third party cookies.

Advantageously, the consent system enables a consumer to save consent choices in an account with the consent system where they do not expire or get deleted the way that browser cookies can get deleted or expire.

Advantageously, the consent system enables different publishers to retrieve the consumer consent choices saved in an account with the consent system when the consumer visits the different publisher sites, in some cases without providing a popup UI and without requiring the consumer to make additional consent choices (i.e., enabling "cross-platform consent").

Advantageously, the consent system enables a publisher to retrieve other information saved in, or corresponding to, a consumer account and the consent system. The publisher may use the other information to recognize a consumer and provide customized content when it visits the publisher's site.

DETAILED DESCRIPTION OF THE INVENTION

Disclosed is a method implementing a consent system. The consent system enables a publisher, such as a publisher of a web site, to provide consent options (including saving consent choices) to a site visitor, such as a browser, quickly and efficiently confirm consent choices corresponding to site visitors; and manage the consent options provided to site visitors. The consent system enables a site visitor to quickly and efficiently make consent choices, save consent choices, and manage consent choices.

Figure 1:
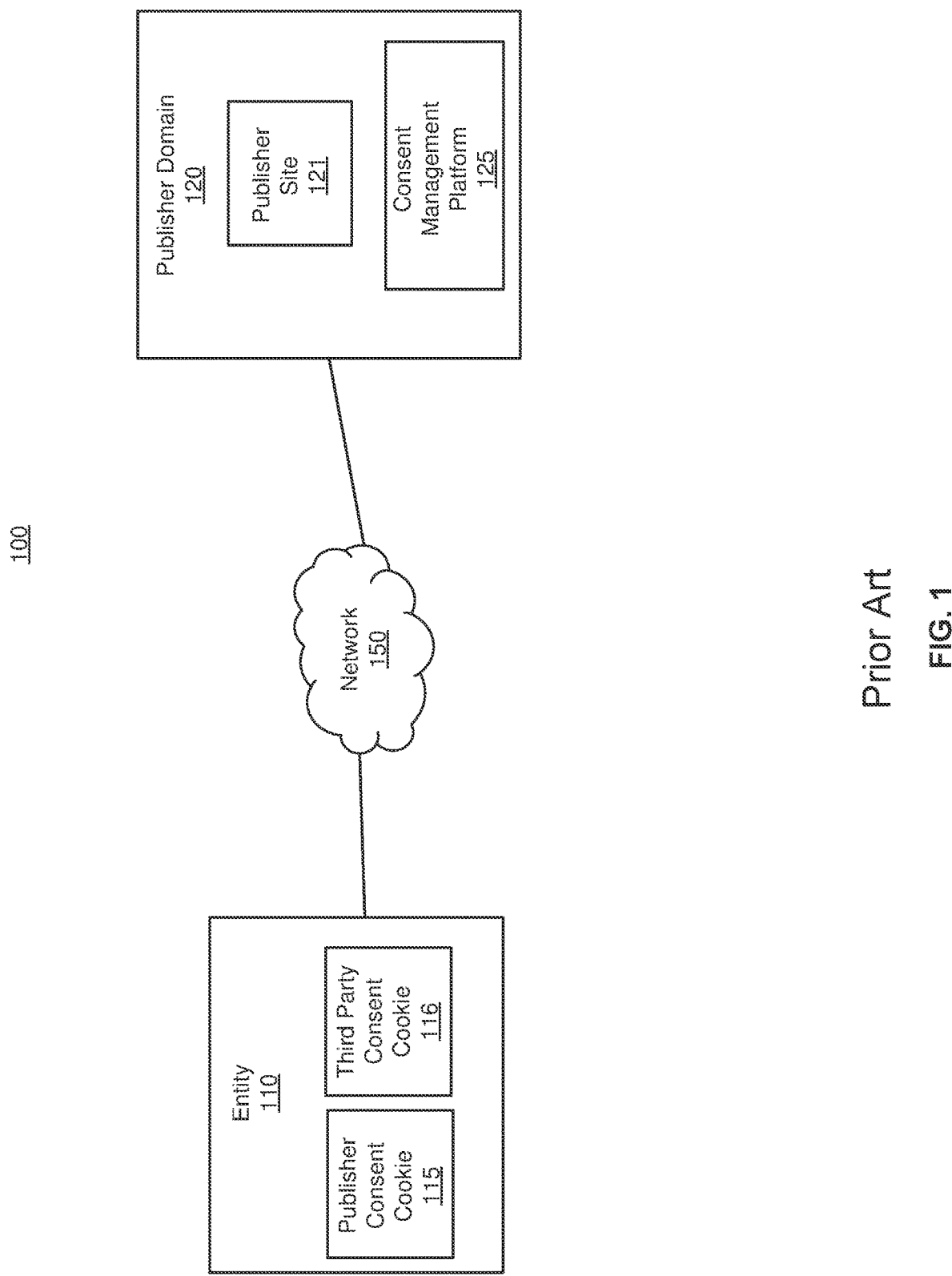
FIG. 1 illustrates an example consent-enabling computing environment, in accordance with the prior art.

FIG. 1 illustrates an example computing environment in accordance with the prior art. As shown in FIG. 1, the computing environment 100 comprises entity 110 and publisher domain 120. These elements are connected by communication network 150 such as a local area network, a wide area network, a wireless network, an intranet, a cable network, a satellite network, a cellular phone network, an optical network, the Internet, or combinations thereof. Computing environment 100 may include more, fewer, and/or different elements than the ones shown in FIG. 1. Moreover, the functionalities can be distributed among the elements in a different manner than described here.

Entity 110 visits, or accesses, publisher domain 120 over communication network 150. (In other words, publisher domain 120 "receives" entity 110). Entity 110 may comprise publisher consent cookie 115 and/or third party consent cookie 116. Examples of entity 110 include software installations, hardware devices, or both. Software installations may include a web entity instance (such as a browser), a mobile application instance, a video viewer instance, or set-top box software residing on a hardware device. A hardware device may be comprise a computer, personal digital assistant (PDA), cell phone, or set-top unit (STU) such as a STU used in conjunction with television service. A user of entity 110 is a person or group of people who visit or access publisher domain 120 via entity 110. For example, a user of entity 110 may operate entity 110 installed on a laptop computer to access publisher domain 120. A user of entity 110 will be referred to as "consumer 110." In some cases, consumer 110 comprises a combination of entities which are logically grouped together to represent individuals, households, or groups of individuals who access publisher domain 120. In an example, entity 110 visits, or accesses, publisher site 121 by entering the URL corresponding to publisher site 121 in a browser. In another example, entity 110 visits, or accesses, publisher site 121 by logging into a mobile application. Although only one entity 110 is shown in FIG. 1 for clarity, any number of entities may be connected to the communication network 150. Entity 110 may include more, fewer, and/or different elements than the ones shown in FIG. 1. Moreover, the functionalities can be distributed among the elements in a different manner than described here.

Publisher consent cookie 115 is a first party cookie comprising software code stored in entity 110 which contains information, including privacy consent information, corresponding to entity 110. Publisher consent cookie 115 is "set" (i.e., the software code corresponding to publisher consent cookie 115 is stored in entity 110) by publisher site 121 in entity 110 when entity 110 visits publisher site 121. Because publisher consent cookie 115 is a first party cookie, only publisher domain 120 can access publisher consent cookie 115, and only when entity 110 visits publisher site 121. Publisher site 121 may use privacy consent information provided by publisher consent cookie 115 to determine actions to take when entity 110 visits publisher site 121. The available actions may be determined by applicable laws and regulations. For example, if entity 110 originates in the European Union, the General Data Protection Regulation ("GDPR") requires that publisher domain 120 provide an option to entity 110 on publisher site 121 to opt-out of the use of certain cookies (e.g., targeted advertising cookies) by publisher site 121. In this case, if publisher consent cookie 115 contains a consent choice to opt-out of the use of certain cookies, publisher site 121 will not use those certain cookies with respect to entity 110. First party cookie 115 may contain an IAB Transparency & Consent string ("TC String") such as euconsent-v2 or noniabvendorconsent. Although only one publisher consent cookie 115 is shown in FIG. 1 for clarity, entity 110 may comprise any number of publisher consent cookies.

Publisher consent cookie 115 will remain in entity 110 until entity 110 or publisher site 121 removes it. Publisher consent cookie 115 may have an expiration day/time; in that case, publisher consent cookie 115 may remain in entity 110 but will be considered expired by publisher domain 120 after the expiration day/time and thus will be treated by publisher domain 120 as if publisher consent cookie 115 does not exist in entity 110.

Third party consent cookie 116 comprises software code stored in entity 110 which contains information, including privacy consent information, corresponding to entity 110. Third party consent cookie 116 may be set by a third party domain (i.e., an entity other than entity 110 and publisher domain 120) in entity 110. Because third party consent cookie 116 is a third party cookie, domains other than the third party domain can access third party consent cookie 116 when entity 110 visits a site on the other domain. For example, publisher site 121 can access third party consent cookie 116 when entity 110 visits publisher site 121. Publisher site 121 may use privacy consent information provided by third party consent cookie 116 to determine actions to take when entity 110 visits publisher site 121, as described above with respect to publisher consent cookie 115. Third party consent cookie 116 may contain a TC string. Although only one third party consent cookie 116 is shown in FIG. 1 for clarity, entity 110 may comprise any number of third party consent cookies Third party consent cookie 116 will remain in entity 110 until entity 110 or publisher domain 120 removes it. Third party consent cookie 116 may have an expiration day/time; in that case, third party consent cookie 116 may remain in entity 110 but will be considered expired by publisher site 121 after the expiration day/time and thus will be treated by publisher site 121 as if third party consent cookie 116 does not exist in entity 110.

Publisher domain 120 is a media channel provided by a publisher which provides content over communications network 150 to entity 110. Publisher domain 120 comprises publisher site 121 and consent management platform module ("CMP") 125. A user of publisher domain 120 may be a domain manager, site manager, or a manager of other resources at publisher domain 120. A user of publisher domain 220 will be referred to as "publisher 120." Publisher domain 120 may include more, fewer, and/or different elements than the ones shown in FIG. 1. Moreover, the functionalities can be distributed among the elements in a different manner than described here.

Publisher site 121 provides content to entity 110 over communications network 150. Examples of publisher site 121 may comprise web sites, mobile sites, mobile/desktop applications, and video delivery services (e.g., television, streaming services, or connected TV). When entity 110 visits publisher site 121, entity 110 executes publisher site 121 software (e.g., HTML, JavaScript) ("publisher site 121 software"). Although only one publisher site 121 is shown in FIG. 1 for clarity, publisher domain 120 may contain any number of sites.

CMP 125 comprises software that executes when entity 110 visits publisher site 121. CMP 125 may provide an interactive user interface ("CMP 125 UI") in publisher site 121 (i.e., provides a "popup UI"). CMP 125 enables consumer 110 to make and enter consent choices ("consumer 110 consent choices") when entity 110 visits publisher site 121. Consent choices may include choices corresponding to legal/regulatory requirements (e.g., requesting opt-out or rejecting use of cookies for targeted advertising). Consent choices may be as consent strings, such as IAB TCF consent strings euconsent-v2 or noniabvendorconsent.

In one embodiment, CMP 125 checks to see if a valid publisher consent cookie 115 exists in entity 110. For example, CMP 125 may check to see if an unexpired publisher consent cookie 115 exists in entity 110. If a valid publisher consent cookie 115 exists in entity 110, CMP 125 terminates execution. If a valid publisher consent cookie 115 does not exist in entity 110, CMP 125 executes code to provide CMP 125 UI to entity 110 in publisher site 121, enabling consumer 110 to make selections corresponding to consent choices. Upon receiving consent choices from entity 110, CMP 125 sets first party cookie 115 in entity 110 containing information corresponding to the received consent choices.

In another embodiment, CMP 125 checks to see if either a valid publisher consent cookie 115 or a valid third party consent cookie 116 exists in entity 110. For example, CMP 125 may check to see if an unexpired publisher consent cookie 115 and/or an unexpired third party consent cookie 116 exists in entity 110. In this embodiment, if either a valid publisher consent cookie 115 or a valid third party consent cookie 116 exists. CMP 125 terminates execution. If neither a valid publisher consent cookie 115 nor a valid third party consent cookie 116 exists in entity 110, CMP 125 executes code to provide CMP 125 UI to entity 110 in publisher site 121, enabling consumer 110 to make selections corresponding to consent choices. Upon receiving consent choices from entity 110. CMP 125 sets first party cookie 115 in entity 110 containing information corresponding to the received consent choices.

Figure 2:
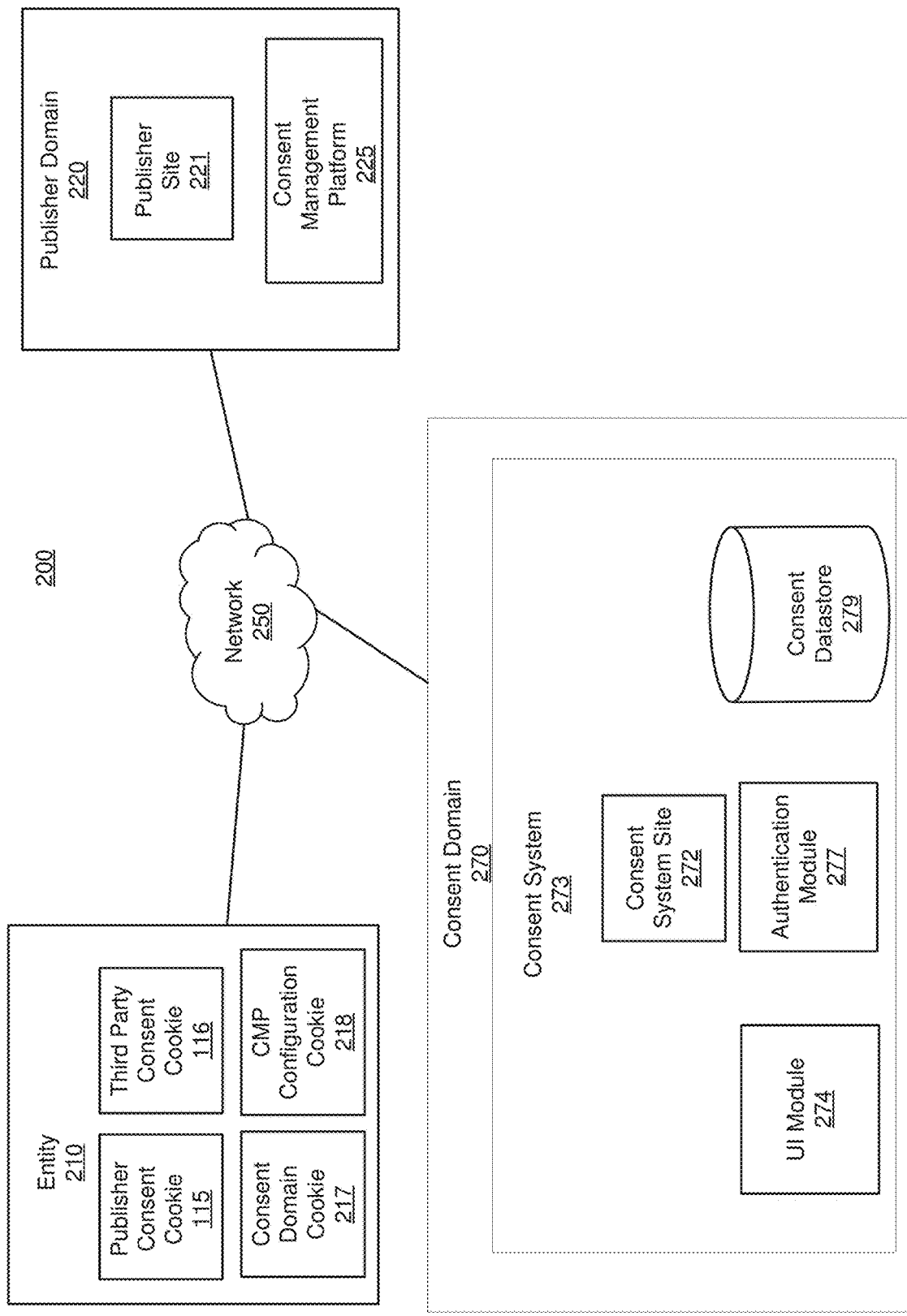
FIG. 2 illustrates an example consent system computing environment, in accordance with an embodiment of the invention.

FIG. 2 illustrates an example computing environment in accordance with an embodiment of the invention. As shown in FIG. 2, computing environment 200 comprises entity 120, publisher domain 220, and consent domain 270. These elements are connected by communication network 250, such as a local area network, a wide area network, a wireless network, an intranet, a cable network, a satellite network, a cellular phone network, an optical network, the Internet, or combinations thereof. Computing environment 200 may include more, fewer, and/or different elements than the ones shown in FIG. 2. Moreover, the functionalities can be distributed among the elements in a different manner than described here.

The following describes the elements of computing environment 200 at a high level. The functioning of the elements of computing environment 200 is described in detail with respect to FIGS. 3-8.

FIG. 2 illustrates an embodiment where publisher domain 220 and consent domain 270 are separate and independent domains. A domain comprises a collection of sites, such as publisher site 121, which are connected by a business relationship. Within a domain, one publisher site of the collection of sites may have the ability to access and/or control aspects of another publisher site of the collection of sites, such as site data and site configurations. Within a domain, a user such as a domain and/or site manager may have the ability to access and/or control aspects of one or more sites of the collection of sites, such as site data and site configurations. An embodiment where aspects of consent system 273 reside within publisher domain 220 is described with respect to FIG. 8 below.

Entity 210 accesses publisher domain 220 over communication network 150, as described above with reference to entity 110. Entity 210 comprises publisher consent cookie 115 and third party consent cookie 116, as described above. ((In other words, publisher domain 220 "receives" entity 210). Entity 210 further comprises consent domain cookie 217 and CMP configuration cookie 218. A user of entity 210 will be referred to as "consumer 210." Entity 210 may include more, fewer, and/or different elements than the ones shown in FIG. 2. Moreover, the functionalities can be distributed among the elements in a different manner than described here.

Consent domain cookie 217 is a first party cookie comprising software code stored in entity 210 which contains information, including consent choices, corresponding to entity 210. Consent domain cookie 217 is set by consent system 273 in consent system 173 when entity 210 visits consent domain 270. In one embodiment, entity 210 visit consent system 173 by visiting publisher site 221 and being redirected to consented system 173 by publisher domain 220. In another embodiment, consumer 220 visits consent system 173 by visiting consent system site 272.

Advantageously, consent domain cookie 217 provides an additional option for publisher site 221 to confirm consent choices, in addition to publisher consent cookie 115 and/or third party consent cookie 116. Advantageously, consent domain cookie 217, as a first party cookie, may receive preferred treatment by entity 210 and/or publisher site 221 compared to third party consent cookie 116. For example, entity 210 may be less likely to remove consent domain cookie 217 than third party consent cookie 116, and/or entity 210 may be more likely to assign a longer expiration period to consent domain cookie 217 than to third party consent cookie 116. In other words, first party cookies are "more persistent" than third party cookies; thus, consent domain cookie 217 may be more persistent than third party consent cookie 116. Additionally, some entities, like the Safari® browser, do not allow third party cookies like third party consent cookie 116 but do allow first party cookies like consent domain cookie 217.

CMP configuration cookie 218 is a first party cookie comprising software code stored in entity 210 which contains information corresponding to CMP 225. CMP configuration cookie 218 is set by publisher site 221 in entity 210. CMP configuration cookie 218 may contain information corresponding to the current configuration of the CMP (e.g., supported vendors, version of current laws/regulations). Advantageously, publisher 220 can use CMPconfig to determine if a consent cookie found in entity 210 may be invalid because it contains consent choices corresponding to an out of date version of CMP 225.

Publisher domain 220 is a media channel provided by a publisher which provides content over communications network 150 to entity 110, as described with respect to publisher domain 11 above. Publisher domain 220 comprises publisher site 221 and consent management platform ("CMP") 225. A user of publisher domain 220 may be a domain manager, site manager, or a manager of other resources at publisher domain 120. A user of publisher domain 220 will be referred to as "publisher 220." Publisher domain 220 may include more, fewer, and/or different elements than the ones shown in FIG. 2. Moreover, the functionalities can be distributed among the elements in a different manner than described here.

Publisher site 221 provides content to entity 110 over communications network 250, as described above with reference to publisher site 221. When entity 210 visits publisher site 121, entity 110 executes publisher site 221 software, as described above with reference to publisher site 121. Although only one publisher site 221 is shown in FIG. 2 for clarity, publisher domain 120 may contain any number of sites.

CMP 225 comprises software integrated into publisher site 221 software. When entity 210 visits publisher site 221, entity 210 executes publisher site 221 software, including executing CMP 225. CMP 225 may provide an interactive user interface ("CMP 225 UI") in publisher site 221. CMP 225 enables entity 210 to make consent choices ("entity 210 consent choices") when entity 110 visits publisher site 221, and sets publisher consent cookie 115, as described above with respect CMP 125 in FIG. 1. Consent choices may include choices corresponding to legal/regulatory requirements (e.g., requesting opt-out or rejecting use of cookies for targeted advertising). Consent choices may include choices corresponding to an account at consent system 273 (e.g., who may access information stored in an account at consent system 273). CMP 225 also redirects entity 210 to consent system site 272, which enables consent system 273 to provide consent choices from consent domain cookie 217 to publisher domain 220. Redirecting entity 210 also enables consumer 220 to make selections corresponding to consent choices, create an account at consent domain 270, log into an account at consent domain 270, and/or save consent choices in an account in consent system 273. In some embodiments, CMP 225 may collect consumer 210 consent choices and/or account information and/or other consumer 210 information and forward it to consent system site 272. Other consumer 210 information may comprise consumer 210 information such as email address, consumer 210 IP address, publisher 220-specific consumer 210 identifier, consumer 210 offline behavior, consumer 210/entity 210 online behavior.

Consent domain 270 comprises consent system 273, which comprises consent system site 272, UI module 274, authentication module 277, and consent data store 279. Consent system 273 may set consent domain cookie 217 and provide information corresponding to consent domain cookie 217 to publisher site 221. Consent system 273 may provide information corresponding to consumer 210, such as saved consent choices and other consumer information, to publisher site 221. Consent system 273 enables consumer 210 to make and save consent choices at consent system 273. Consent system 273 enables publisher domain 220 to make and save CMP 225 configuration choices at consent domain 270. Consent system 273 may enable publisher domain 220 to access consent choices and/or other information saved at consent system 273 by consumer 210. Consent domain 270 may include more, fewer, and/or different elements than the ones shown in FIG. 2. Moreover, the functionalities can be distributed among the elements in a different manner than described here.

Consent system site 272 may be a web site, mobile site, or mobile/desktop/web application. When entity 210, consumer 210, or publisher 220 visits, or accesses, consent system site 272, entity 210, consumer 210, and/or publisher 220 executes software corresponding to consent system site 272 (e.g., HTML, JavaScript), which may include executing software associated with user interface module 274 ("UI module 274"), authentication module 277, and/or consent datastore 279.

In one embodiment, entity 210 visits consent system site 272 by being redirected to consent system site 272 by publisher site 221. (In other words, consent system site 272 "receives" entity 210 by being redirected by publisher site 221). In another embodiment, consumer 210 or publisher 220 visits consent system site 272 directly, for example by entering a URL corresponding to consent system site 272 in a browser window. (In other words, consent system site 272 "receives" entity 210 by entity 210 directly accessing consent system site 272).

UI Mode 274 comprises code that may execute when entity 210, consumer 210, and/or publisher 220 visits consent system site 272. When software corresponding to UI module 274 executes. UI module 274 may provide a UI module 274 interactive graphical user interface ("UI module 274 UI") in consent system site 272. UI module 274 enabling entity 210, consumer 210, and/or publisher 220 to enter, save, and/or access consent choices (saved consent choices are stored by UI module 274 in consent datastore 279) and/or create/login to a consent system 273 account (account information is stored by UI module 274 in consent datastore 279).

Authentication module 277 comprises code that may execute when entity 210, consumer 210, and/or publisher 220 visits consent system site 272. When software corresponding to authentication module 274 executes. UI module 274 may provide UI module 274 UI in consent system site 272, enabling consumer 210 or publisher 220 to create an account and/or log into an account in consent system 273. Account information is stored by authentication module 277 in consent datastore 279. When software corresponding to authentication module 274 executes, authentication module 274 may confirm that entity 210, consumer 210, or publisher 220 is logged into an account in consent system 273. Authentication module 277 may comprise an authentication/authorization/account management system like AWS Cognito.

Consent datastore 279 stores consent choices, CMP 225 and UI Module 274 configuration choices, account information, and/or other information corresponding to entity 110, consumer 110, and/or publisher 220. Other information may comprise identifiers. For example, consent datastore 279 may store a unique identifier associated with entity 210, consumer 210, and/or publisher 220. Consent datastore 279 may store a unique identifier associated with entity 210 or consumer 210 that is a hash of an email corresponding to consumer 220 combined with an identifier associated with publisher 220. Other information may comprise email addresses. IP addresses, consumer 210 online/offline behavior, entity 210 online behavior. Consent datastore 279 may store other information corresponding to entity 210, consumer 110, and/or publisher 220 that is provided entity 210, consumer 210, and/or publisher 220 through CMP 225 or UI module 274.

Figure 3:
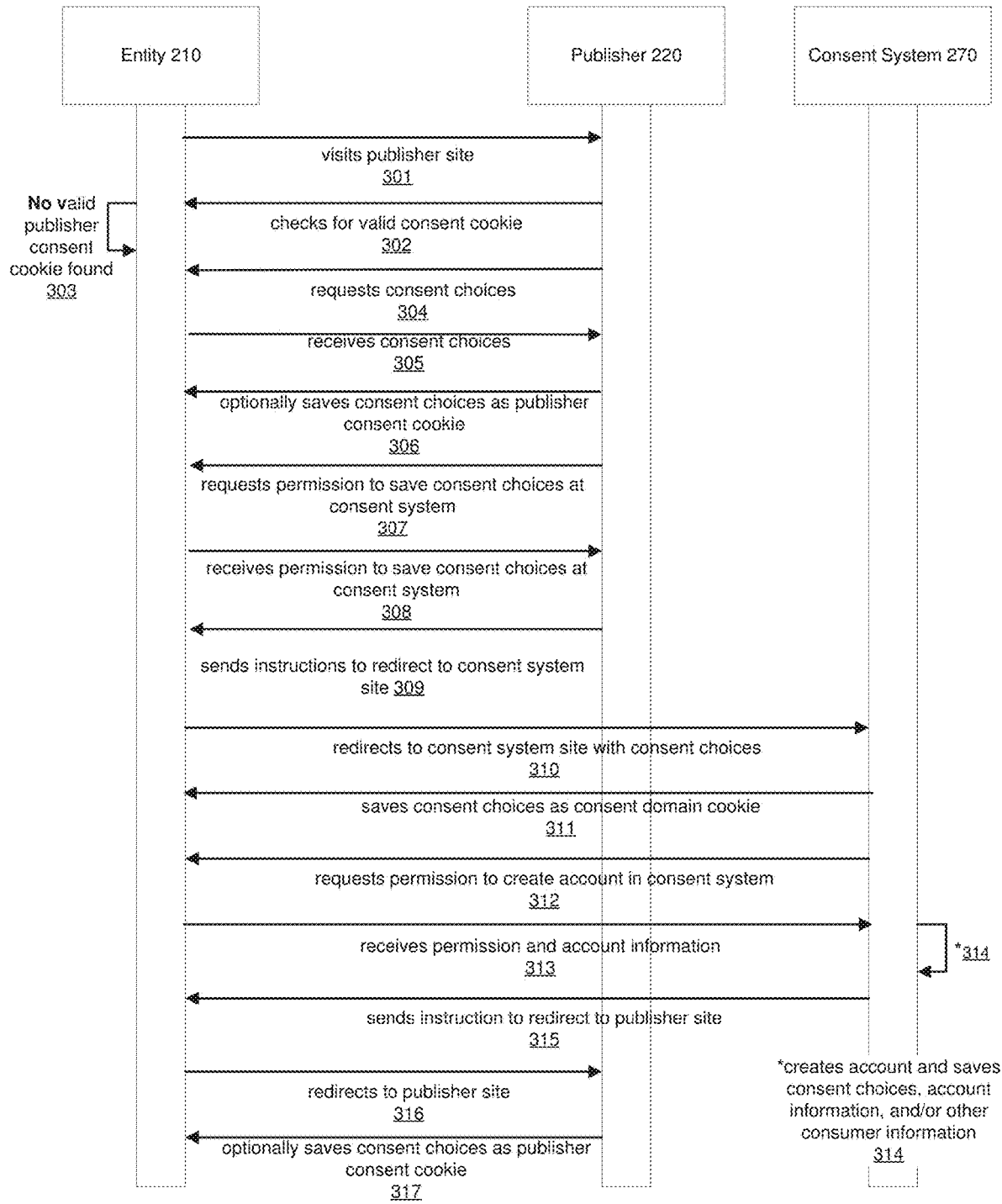
FIG. 3 is an interaction diagram illustrating a method to provide consent choices, in accordance with an embodiment of the invention.

FIG. 3 is a flow chart illustrating a method for enabling consumer 210 to save consent choices when entity 210 visits publisher site 221, according to an embodiment of the invention. FIG. 3 illustrates a method for saving consent choices in an embodiment where entity 210 does not have a valid publisher consent cookie 115 or a valid third party consent cookie 116, and has not saved consent choices at consent system 273. In some implementations, the steps are performed in an order other than the order presented in FIG. 3. In other implementations, more, fewer, or alternative steps may be performed.

At step 301, entity 210 visits, or accesses, publisher site 221 at publisher domain 220.

At step 302, CMP 225 checks for valid publisher consent cookie 115 or valid third party consent cookie 116 in entity 210. To check for valid publisher consent cookie 115/third party consent cookie 116 in entity 210, CMP 225 first checks for the presence of publisher consent cookie 115/third party consent cookie 116. If CMP 225 finds no publisher consent cookie 115/third party consent cookie 116, then publisher site 221 determines that there is no valid publisher consent cookie 115/third party consent cookie 116 in entity 210.

If CMP 225 finds publisher consent cookie 115 and/or third party consent cookie 116 in entity 210, CMP 225 then determines if publisher consent cookie 115/third party consent cookie 116 is valid. CMP 225 may check the expiration date of publisher consent cookie 115/third party consent cookie 116. If publisher consent cookie 115/third party consent cookie 116 is unexpired then CMP 225 determines that it may be valid; if publisher consent cookie 115/third party consent cookie 116 is expired then CMP 225 determines that it is invalid. CMP 225 software may check that the publisher consent cookie 115/third party consent cookie 116 contains the appropriate data, such as consent choices or consent strings. If publisher consent cookie 115/third party consent cookie 116 contains the appropriate data then then CMP 225 determines that it may be valid; if the consent cookie does not contain the appropriate data then then CMP 225 determines that it is invalid. CMP 225 may compare the data contained in CMPconfig (see step 304 below for an explanation of CMPconfig) to the current configuration data of CMP 225. If the data contained in CMPconfig corresponds to the current configuration data of CMP 225 then CMP 225 determines that publisher consent cookie 115/third party consent cookie 116 may be valid; if the data contained in CMPconfig does not correspond to the current configuration data of CMP 225 then then CMP 225 determines that it is invalid. In this situation, CMP 225 may have changed, for example to administer new privacy rules, and the consent choices selected previously (using the version of the CMP corresponding to the data contained in CMPconfig) may be invalid.

At step 303, CMP 225 does not find valid publisher consent cookie 115 or valid third party consent cookie 116.

At step 304, CMP 225 provides CMP 225 UI in publisher site 221 requesting consumer 210 to make consent choices. Consent choices may include choices corresponding to legal/regulatory requirements (e.g., requesting opt-out or rejecting use of cookies for targeted advertising). Consent choices may include choices corresponding to an account at consent system 273 (e.g., who may access information stored in an account at consent system 273). In some embodiments, CMP 225 may request consent system 273 account creation/login information from entity 210). In some embodiments, CMP 225 may request other consumer 210 information, such as an email address or shopping preferences. The CMP 225 UI is described in more detail with respect to FIGS. 6A-6B below.

At step 305, CMP 225 receives consumer 210 consent choices and/or account information and/or other consumer 210 information from entity 210.

At step 306. CMP 225 may save consumer 210 consent choices in publisher consent cookie 115 in entity 210. CMP 225 may save consumer 210 consent choices as consent strings. However, it is preferable to save consumer 210 consent choices as publisher consent cookie 115 in entity 210 after consumer 210 visits, or accesses, consent system 273 (step 308-step 313 below). For example, publisher site 110 may take actions based on a valid publisher consent cookie 115 as soon as publisher consent cookie 115 is set. However, consumer 210 may make different consent choices while saving consent choices at consent system 273. In that case, publisher site 221 may take actions that are inappropriate given consumer 210's final consent choices. CMP 225 may store information corresponding to the current configuration of the CMP (e.g., supported vendors, current version of laws/regulations) in CMP configuration cookie 218. Advantageously, publisher 220 can use CMP configuration cookie 218 to determine if a consent cookie found in entity 210 may be invalid because it contains consent choices corresponding to an out of date version of CMP 225, as described above at step 302.

At step 307, CMP 225 requests permission from consumer 210 to save consent choices and/or account creation/login information and/or other consumer 210 information at consent system 273.

At step 308, CMP 225 receives permission from consumer 210 to save consumer 210 consent choices and/or account creation/login information and/or other consumer 210 information at consent system 273.

At step 309, CMP 225 instructs entity 210 to redirect to consent system site 272 by providing the consent system site 272 URL to entity 210. The consent system site 272 URL contains entity 210 consent choices and/or account creation/ login information and/or other consumer 210 information as parameters such as query parameters.

At step 310, entity 210 redirects to consent system site 272 using the consent system site 272 URL containing entity 210 consent choices and/or account information and/or other consumer 210 information as one or more parameters.

At step 311, UI module 274 receives entity 210 consent choices and/or account information and/or other information from parameters in the consent system site 272 URL. UI module 274 saves entity 210 consent choices as consent domain cookie 217 in entity 210.

At step 312, UI module 274 may provide UI module 274 UI in consent system site 172 requesting consumer 210 permission and account information to create an account in consent system 273. The UI module 274 UI is described in more detail with respect to FIGS. 7A-5C below. In some embodiments, UI module 274 receives permission and account information from CMP 225 in the consent system site 272 URL.

At step 313, UI module 274 receives permission to create an account and account information from consumer 210. UI module 274 forwards consumer 210 account information, consumer 210 consent choices, and/or other consumer 210 information to authentication module 277.

At step 314, authentication module 277 creates and authenticates an account for consumer 210 ("consumer 210 account") in consent system 273. Authentication module 277 saves consumer 210 account information, consumer 210 consent choices, and/or other consumer 210 information in consumer 210 account in consent datastore 279. In an embodiment where UI module 274 does not receive permission to create an account and account information from consumer 210, this step is not executed.

At step 315, UI module 274 instructs entity 210 to redirect to publisher domain 220 by providing the publisher site 221 URL to entity 210. The publisher site 221 URL contains the consent choices made by entity 210 at consent system 273 in a parameter such as a query parameter. UI module 274 may provide other consumer 210 information corresponding to, or saved in, consumer 210 account at consent system 273 in the publisher site 221 URL.

At step 316, entity 210 redirects to publisher site 221 using the publisher site 221 URL.

At step 317, CMP 225 may retrieve entity 210 consent choices from the parameters in publisher site 221 URL and save them as publisher consent cookie 115 in entity 210; this may overwrite entity 210 consent choices saved in consent domain cookie 217 in step 305. CMP 225 may store information corresponding to the current configuration of CMP 225 in CMP configuration cookie 218; this may overwrite configuration information stored in CMP configuration cookie 218 in step 305.

Advantageously, the method described above provides two additional options for consumer 210 to save consent choices: as consent domain cookie 217 and/or in an account at consent domain 273. As described with respect to FIG. 4 below, saving consent choices as consent domain cookie 217 and/or in an account at consent domain 273 gives publisher 220 additional options to confirm consent choices when entity 210 visits publisher site 221. Advantageously, publisher 220 may be able to confirm consent choices in consent domain cookie 217 without requiring consumer 210 to view a user interface and without requiring consumer 210 to make consent choice selections.

FIG. 3 illustrates also a method for saving consent choices in another embodiment of the invention, where entity 210 initially has a valid publisher consent cookie 115 and/or a valid third party consent cookie 116 and has not saved consent choices at consent system 273, with the following changes:

A step 303, valid publisher consent cookie 115 and/or valid third party consent cookie 116 is found.

Step 304 (CMP 225 requests consumer 210 to make consent choices") is not executed.

Step 305 ("CMP 225 receives consent choices from entity 210") is executed as "CMP 225 retrieves entity 210 consent choices from publisher consent cookie 115 or third party consent cookie 116."

Step 306 is not executed.

Advantageously, this embodiment provides two additional options for consumer 210 to save consent choices: as consent domain cookie 217 and/or in an account at consent domain 273, even if there is a valid publisher consent cookie 115 or valid third party cookie 116. As described with respect to FIG. 4 below, saving consent choices as consent domain cookie 217 and/or in an account at consent domain 273 gives publisher 220 additional options to confirm consent choices when entity 210 visits publisher site 221, for example if entity 210 visits publisher site 221 and publisher consent cookie 115 and third party cookie 116 have become invalid.

FIG. 3 also illustrates a method for saving consent choices in another embodiment of the invention, where UI module 274 (instead of CMP 225) requests and receives consent choices and permission to save consent choices at consent domain 273, with the following changes:

Steps 304-308 are not executed.

Step 309 is executed as "CMP 225 instructs entity 210 to redirect to consent system 273 by providing the consent system site 272 URL to entity 210." However, the consent system site 272 URL does not contain contains consumer 210 consent choices and/or account creation/login information and/or other consumer 210 information as parameters such as query parameters.

Following step 310, the following steps are added:

At step 310a (not shown), UI module 274 provides UI module 274 UI in consent system site 272 requesting consumer 210 to make consent choices and/or provide other consumer 210 information from entity 210.

At step 310b (not shown), UI module 274 receives consumer 210 consent choices and/or other consumer 210 information from entity 210.

Advantageously, this embodiment enables consumer 210 to provide and save consent choices and/or account creation/login information and/or other consumer 210 information by only viewing one user interface.

Figure 4:
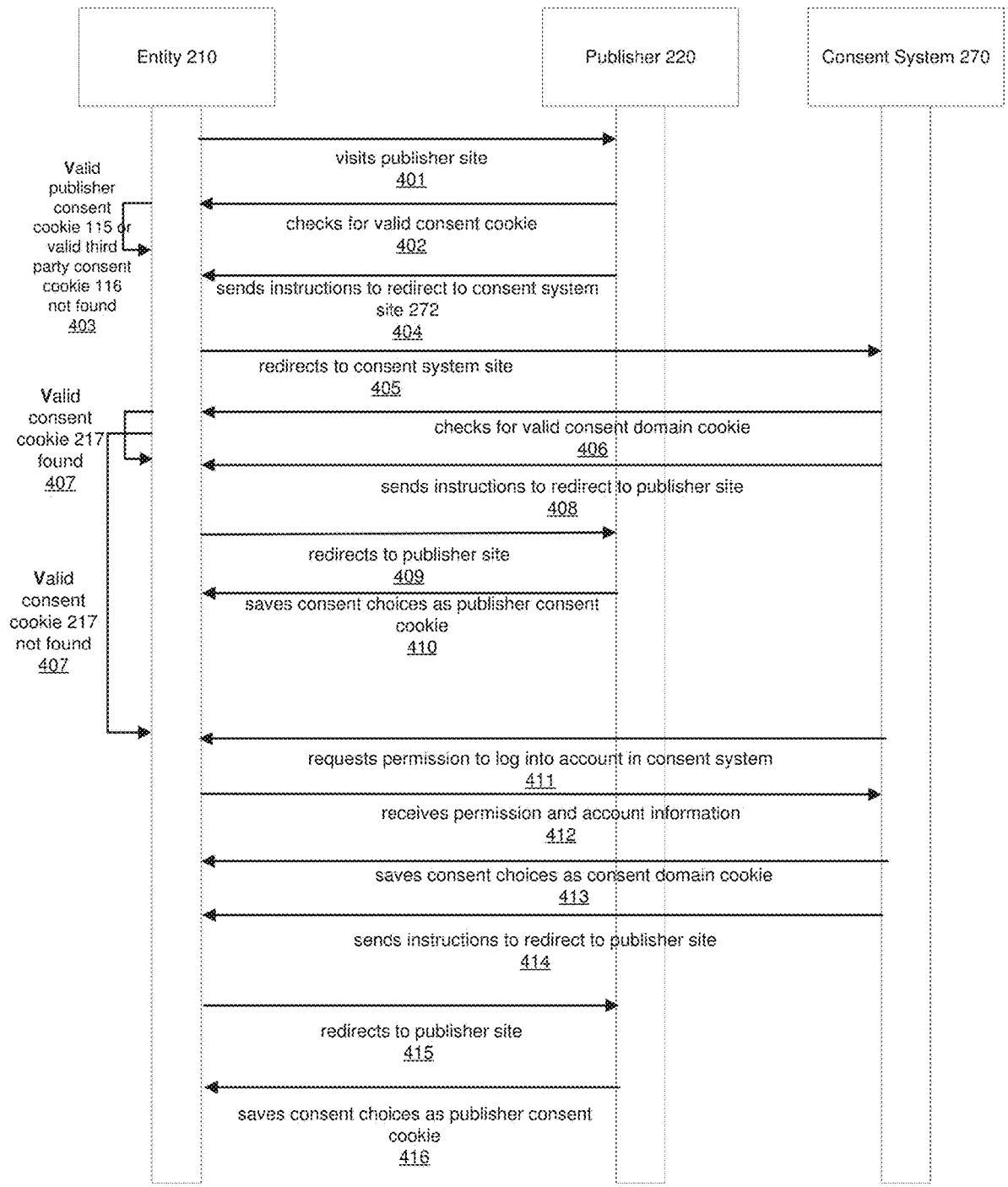
FIG. 4 is an interaction diagram illustrating a method to provide consent choices, in accordance with another embodiment of the invention.

FIG. 4 is a flow chart illustrating a method for saving consent choices according to an embodiment of the invention. FIG. 4 illustrates a method for saving consent choices in an embodiment where entity 210 does not have valid publisher consent cookie 115 or valid third party consent cookie 116, but has saved consent choices at consent system 273. In some implementations, the steps are performed in an order other than the order presented in FIG. 4. In other implementations, more, fewer, or alternative steps may be performed.

At step 401, entity 210 visits, or accesses, publisher site 221 at publisher domain 220.

At step 402, CMP 225 checks for valid publisher consent cookie 115 or a valid third party consent cookie 116 in entity 210, as described above.

At step 403, CMP 225 does not find valid publisher cookie 115 or valid third party cookie 116.

At step 404, CMP 225 instructs entity 210 to redirect to consent system site 272. CMP 225 may include CMPconfig and the current CMP configuration information, for example in a parameter of the consent system site 272 URL.

At step 405, entity 210 redirects to consent system site 272.

At step 406, UI module 274 checks for valid consent domain cookie 217, as described with respect to step 302 above.

At step 407, if UI module 274 finds valid consent domain cookie 217, the method continues at step 408; if UI module 274 does not find valid consent domain cookie 217, the method continues at step 411.

At step 408, UI module 274 accesses consumer 210 consent choices from consent domain cookie 217 in entity 210. In an embodiment, UI module 274 instructs entity 210 to redirect to publisher site 221 using publisher site 221 URL containing the consumer 210 consent choices in a parameter. In this embodiment, the method continues at step 409. In another embodiment, the method continues at step 411.

At step 409, entity 210 redirects to publisher site 221 using publisher site 221 URL containing the consumer 210 consent choices in a parameter.

At step 410, CMP 225 saves consumer 210 consent choices as publisher consent cookie 115 in entity 210. In this embodiment, steps 411-416 are not executed.

Advantageously, in this embodiment, publisher 220 has an additional option to confirm consent choices using consent domain cookie 217 when entity 210 does not have a valid publisher consent cookie 115 or a valid third party consent cookie 116. Advantageously, publisher 220 can confirm consent choices in consent domain cookie 217 without requiring consumer 210 to view an additional user interface (i.e., CMP 225) and without requiring consumer 210 to make additional consent choice selections.

In another embodiment, at step 411, UI module 274 requests consumer 210 permission to log into an account in consent system 273. UI module 274 may provide UI module 274 UI in consent system site 172 requesting consumer 210 permission to log into an account in consent system 273. Alternatively, UI module 274 may receive permission from authentication module 277, for example, if consumer 210 previously provided permission to consent system 273 remain logged into consent system 273 or to auto-log into consent system 273 when entity 210 visits consent system site 273; in this case, UI module 274 does not provide UI module 274 UI in consent system site 272.

At step 412, UI module receives permission and account information from consumer 210 or from authentication module 277.

At step 413, UI module 274 accesses consumer 210 consent choices from consumer 210 account at consent domain 273 and saves consumer 210 consent choices in consent domain cookie 217 in entity 210.

In step 414, UI module 274 instructs entity 210 to redirect to publisher site 221 using publisher site 221 URL containing the consumer 210 consent choices in a parameter. UI module may provide other consumer 210 information corresponding to consumer 210 account at consent system 273 as one or more parameters in publisher site 221 URL.

At step 414, entity 210 redirects to publisher site 221 using publisher site 221 URL containing the consumer 210 consent choices and/or other consumer 210 information.

At step 410, CMP 225 saves consumer 210 consent choices as publisher consent cookie 115 in entity 210. CMP 225 may store information corresponding to the current configuration of CMP 225 in CMP configuration cookie 218.

Advantageously, in this embodiment, publisher 220 has an additional option to confirm consent choices when entity 210 does not have a valid publisher consent cookie 115, valid third party consent cookie, or valid consent domain cookie 217. Advantageously, publisher 220 can confirm consent choices saved in consumer 210's consent system 273 account without requiring consumer 210 to view an additional user interface (i.e., CMP 225 UI) and without requiring consumer 210 to make additional consent choice selections. Advantageously, publisher 220 can confirm consent choices saved in consumer 210's consent system 273 account without requiring consumer 210 to manually log into consent system 273.

Figure 5:
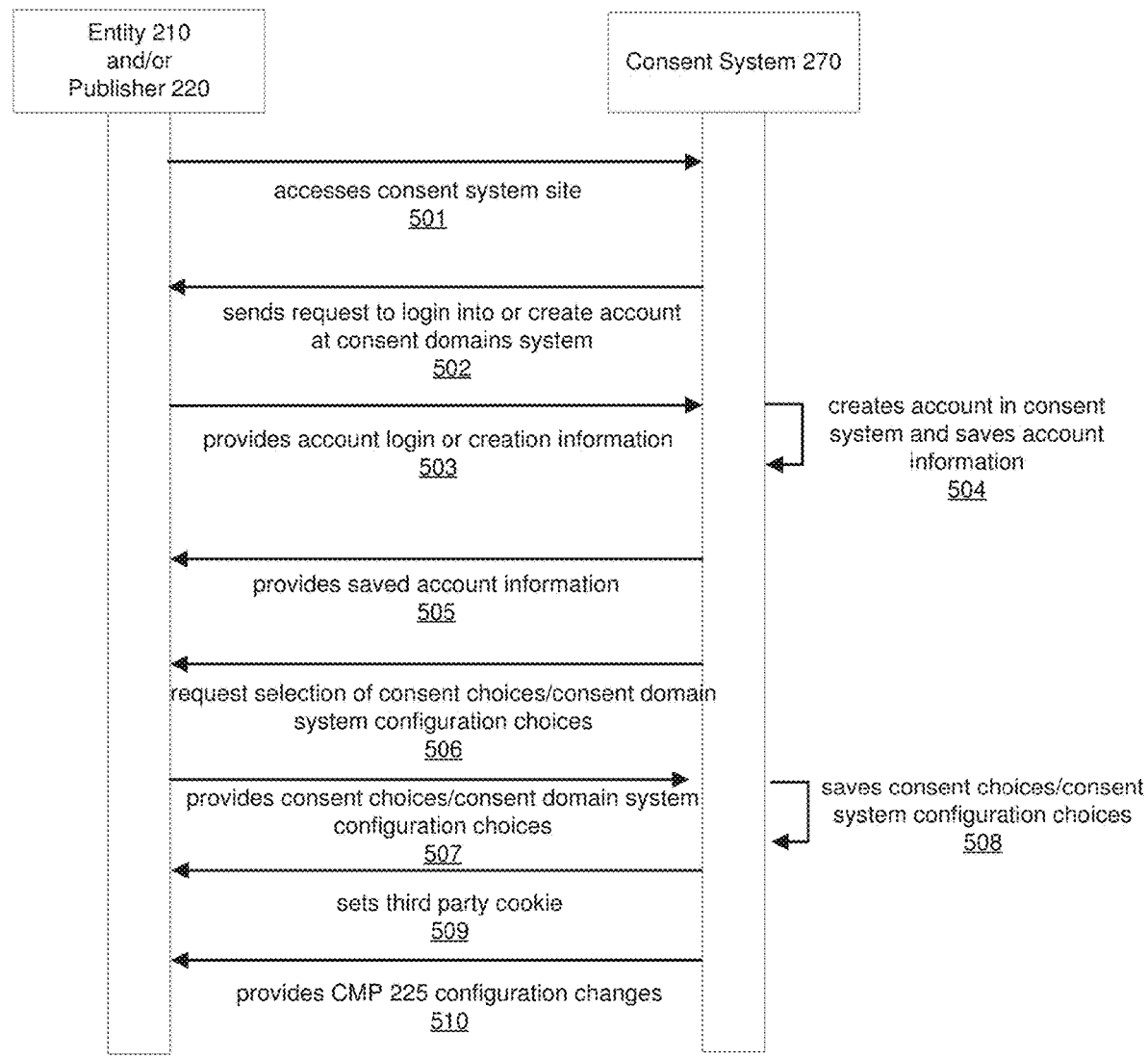
FIG. 5 is an interaction diagram illustrating a method to provide consent choices, in accordance with another embodiment of the invention.

FIG. 5 illustrates is a flow chart illustrating a method for enabling consumer 210 and/or publisher 220 to create an account, log into an account, and select/save/access consent choices and CMP 225/UI Module 274 configuration choices by directly visiting consent system site 272, according to an embodiment of the invention. In some implementations, the steps are performed in an order other than the order presented in FIG. 5. In other implementations, more, fewer, or alternative steps may be performed.

At step 501, consumer 210 or publisher 220 visits, or accesses, consent system site 272 using an entity such as entity 210.

At step 502, UI module 274 provides UI module 274 UI in consent system site 272, requesting consumer 210 or publisher 220 to login into or create an account at consent domain system 273.

In an embodiment, at step 502, UI module 274 provides an option to consumer 210 to create an account that applies to all sites in a publisher domain, or that applies to all sites of all publisher domains (i.e., "permitted" publisher sites). In this embodiment, when entity 210 redirects to and logs into consent domain system 273 from one of the permitted publisher sites, as described above with respect to FIG. 3 and FIG. 4, consent system 273 will provide the saved consent choices to the permitted publisher site, as described above with respect to FIG. 3 and FIG. 4. Advantageously, this embodiment enables consumer 210 to provide consent across multiple publisher sites, domains, and entities (e.g., browsers and mobile applications); i.e., "cross-platform consent." Advantageously, this embodiment enables consumer 210 to reduce the number of times they may need to see CMP 225 UI and/or UI module 274, make consent choices, and/or log into consent system 273.

In an embodiment, at step 502, UI module 274 provides an option to publisher 220 to create an account that applies to all sites in a publisher domain. In this embodiment, when publisher 220 makes CMP 225 configuration changes at consent system 273, consent system 273 may be configured to send CMP updates to all sites associated with publisher domain 220. Advantageously, publisher 220 can update the CMP corresponding to all sites associated with publisher domain 220 with one selection of changes in consent system 273.

At step 503, consumer 210 or publisher 220 provides account login or account creation information to UI module 272.

At step 504, UI module 274 provides account creation and/or login information to authentication module 277. If needed, authentication module 277 creates an account corresponding to consumer 210 or publisher 220 in consent domain system 273 and saves the account information in consent datastore 279.

At step 505, UI module 274 accesses account information, including consumer 210 consent choices, other consumer 210 information, and/or or publisher site 272 configuration choices (see below) saved in consent datastore 279 and provides it to consumer 210 or publisher 220.

In an embodiment, publisher 220 can access account information saved in the account corresponding to consumer 210. In this embodiment, consent domain system 273 requests permission from entity 210 to provide access to the saved account information to publisher 220 when asking entity 210 to save consent choices as described above with respect to FIG. 3 and/or FIG. 4, or in step 506 below. Publisher 220 may be able to access other consumer 210 information corresponding to consumer 210 such as an email address, IP address, or other identifier. Advantageously, the enables publisher 220 to recognize entity 210 when entity 210 access publisher site 221, and provide customized experiences to entity 210 based other consumer 210 information.

At step 506, UI module 274 requests consumer 210 or publisher 220 to select consent choices (consumer 210) or CMP 225/UI module 274 configuration choices (publisher 220).

CMP 225/UI module 274 configuration choices may include choices corresponding to the functions of CMP 225 UI and/or UI module 274 UI. CMP 225/UI module 274 configuration choices may include choices and options provided by CMP 225 UI and/or UI module 274 UT to entity 210, consumer 210, and/or publisher 220. Choices and options provided by CMP 225 UI and/or UI module 274 UI may be based on changes to legal/regulatory requirements.

At step 507, consumer 210 or publisher 220 provides consent choices (consumer 210) or consent domain system 273 configuration choices (publisher 220) to UI module 274.

At step 508, UI module 274 saves consent choices or configuration choices in consent datastore 279.

At step 509, UI module may set third party consent cookie 116 in entity 210 containing consumer 210 consent choices, if needed.

At step 510, UI module 274 may provide configuration changes for CMP 225 to publisher 220.

In an additional embodiment, consent choices may comprises at option for consent system 273 to save consent choices in a third party cookie. This option may be available any time that consumer 210 makes consent choices, as described with reference to FIGS. 3-5 above. If consumer 210 chooses to save consent choices in a third party cookie, UI module 274 sets third party consent cookie 116 in entity 210 containing consumer 210 consent choices. Third party consent cookie 116 can be accessed by publisher 220 and all other publishers. Advantageously, this embodiment provides publisher 220 an additional option to confirm consent choices when entity 210 does not have a valid publisher consent cookie 115. For example, when entity 210 visits publisher site 221, if CMP 225 finds valid third party cookie 117 but not valid publisher consent cookie 115 at step 403 above, CMP 225 may end execution and publisher domain 220 can take actions based on the consent choices stored in third party cookie 116. Additionally, publisher 220 may set publisher consent cookie 115 in entity 210 using consent choices stored in third party cookie 116. Advantageously, publisher 220 can confirm consent choices saved in third party consent cookie 116 and save publisher consent cookie 115 without requiring consumer 210 to view CMP 225 UI or UI module 274 UI and without requiring consumer 210 to make additional consent choice selections.

Figure 6A:
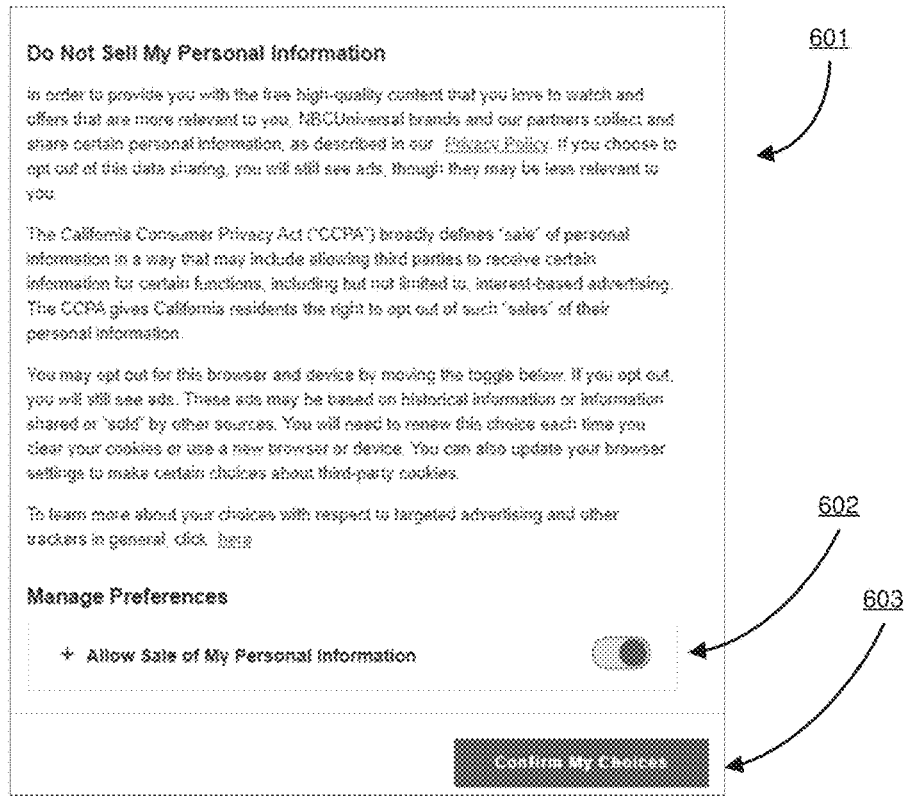
FIGS. 6A-6B are examples of a consent management platform module interactive user interface, in accordance with an embodiment of the invention.
Figure 6B:
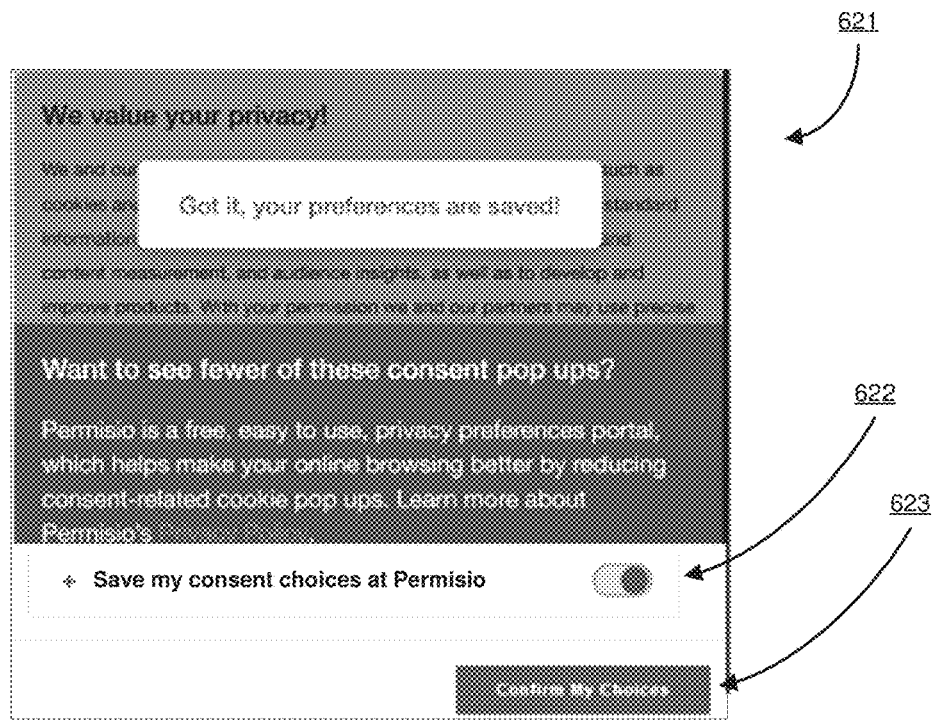

FIGS. 6A-6B illustrate CMP 125 UI, according to an embodiment of the invention. CMP 125 UI enables consumer 210 to make and save consent choices at publisher site 171 and enables consumer 210 to save consent choices at consent domain 220. CMP 125 UI may include more, fewer, and/or different elements than the ones shown in FIGS. 6A-6B. Moreover, the functionalities may be distributed among the interfaces in a different manner than described here.

FIG. 6A illustrates CMP 225 UI 601, according to an embodiment of the invention. CMP 225 provides CMP 225 UI 601 in publisher site 221 when entity 210 visits publisher site 221. CMP 225 UI 601 enables consumer 210 to make and save consent choices at publisher site 221. Consent choice selector 602 provides an option for consumer 210 to make a consent choice; illustrated in FIG. 6A is a choice to allow or not allow sale of consumer 210 personal information. Consent confirmation selector 603 provides an option for consumer 210 to confirm consumer 210 consent choices. Upon receiving confirmation, CMP 225 may set consumer 210 consent choices as publisher consent cookie 115. CMP 225 UI 601 may include more, fewer, and/or different elements than the ones shown in FIG. 6A. Moreover, the functionalities may be distributed among the interfaces in a different manner than described here.

FIG. 6B illustrates CMP 225 UI 621, according to an embodiment of the invention. CMP 225 UI 621 enables consumer 210 save consumer 210 consent choices at consent domain 220. CMP 225 provides CMP 225 UI 621 in publisher site 221 after consumer 210 allows publisher site 221 to save consumer 210 consent choices in CMP 225 UI 601. Save consent choice selector 622 provides an option for consumer 210 to make a choice to save or not save consumer 210 consent choices at consent domain 270 ("Permisio"). Consent save confirmation selector 623 provides an option for consumer 210 to confirm consent save choices. Upon receiving confirmation, CMP 225 may redirect consumer 210 to consent system site 272. CMP 225 UI 601 may include more, fewer, and/or different elements than the ones shown in FIG. Moreover, the functionalities may be distributed among the interfaces in a different manner than described here.

Figure 7B:
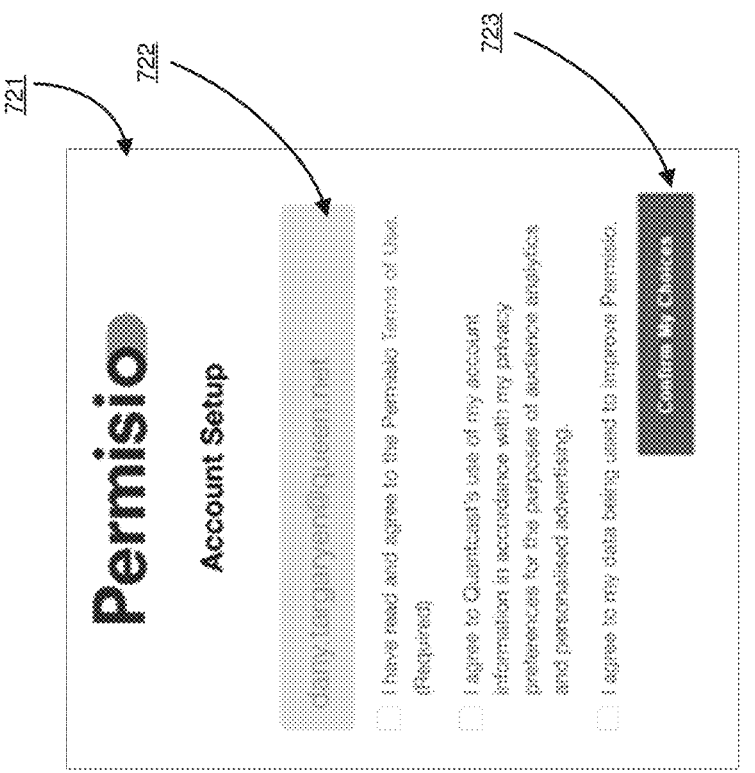
FIGS. 7A-7C are examples of a consent system interactive graphical user interface, in accordance with an embodiment of the invention.
Figure 7A:
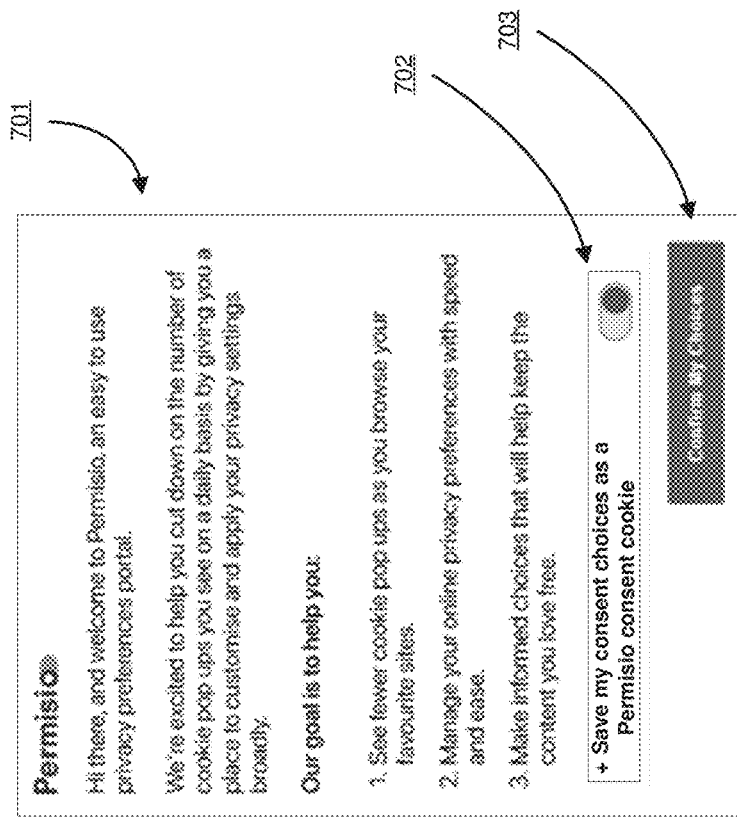
Figure 7C:

FIGS. 7A-7C illustrate UI module 274 UI, according to an embodiment of the invention. UI module 274 UI enables consumer 210 to make and/or save consent choices and/or other consumer 210 information at consent system 273, enables consumer 210 and/or publisher 220 to create/log into an account at consent system 273, and enables publisher 220 to make and/or save CMP 225/UI module 274 configuration choices. UI module 274 UI may include more, fewer, and/or different elements than the ones shown in FIGS. 7A-7c. Moreover, the functionalities may be distributed among the interfaces in a different manner than described here.

FIG. 7A illustrates UI module 274 UI 701, according to an embodiment of the invention. UI module 274 provides UI module 274 UI 701 in publisher site 221 when entity 210 is redirected to consent system 273 by publisher site 221. UI module 274 UI 701 enables consumer 210 to save consumer 210 consent choices as consent domain ("Permisio") cookie 217. Consent domain cookie selector 702 provides an option for consumer 210 to save or not save consumer 210 consent choices as consent domain ("Permisio") cookie 217. Consent domain cookie confirmation selector 703 provides an option for consumer 210 to confirm saving consumer 210 consent choices as consent domain ("Permisio") cookie 217. Upon receiving confirmation, UI module 274 may set consumer 210 consent choices as consent domain cookie 217. UI module 274 UI 701 may include more, fewer, and/or different elements than the ones shown in FIG. 7A. Moreover, the functionalities may be distributed among the interfaces in a different manner than described here.

FIG. 7B illustrates UI module 274 UT 721, according to an embodiment of the invention. UI module 274 UI 721 provides UI module 274 UI 721 in publisher site 221 when entity 210 is redirected to consent system 273 by publisher site 221, or when consumer 210 or publisher 220 visits consent system site 272 directly. UI module 274 UT 721 enables consumer 210 and/or publisher 220 to create an account at consent domain system 273. Email interface 722 provides an option for consumer 210 and/or publisher 220 to enter and email address to create an account. Consent domain account confirmation selector 723 provides an option for consumer 210 and/or publisher 220 to confirm creating an account at consent domain system 273. Upon receiving confirmation, authentication module 277 may create an account for consumer 210 and/or publisher 220 and save account information in consent datastore 279. UI module 274 UI 721 may include more, fewer, and/or different elements than the ones shown in FIG. 7B. Moreover, the functionalities may be distributed among the interfaces in a different manner than described here.

FIG. 7C illustrates UI module 274 UI 741, according to an embodiment of the invention. UI module 274 UI 741 provides UI module 274 UI 741 in publisher site 221 when entity 210 and/or publisher 220 are logged into an account in consent domain system 273. UI module 274 UI 741 enables consumer 210 or publisher 220 to make and/or save consent choices and/or CMP 225/UI module 274 configuration choices and/or account choices in an account at consent domain system 273. Consent/configuration interface 742 provides options for consumer 210 and/or publisher 220 to make consent and/or configuration choices. In one example, upon receiving consumer 210 consent choices from consumer 210, UI module 274 may save consumer 210 consent choices in consent domain cookie 217 in entity 210. In another example, upon receiving of CMP 225 configuration choices from publisher 220, UI module 274 may send updated CMP 225 configuration instructions to publisher site 171. UI module 274 UI 741 may include more, fewer, and/or different elements than the ones shown in FIG. 7C. Moreover, the functionalities may be distributed among the interfaces in a different manner than described here.

Figure 8:
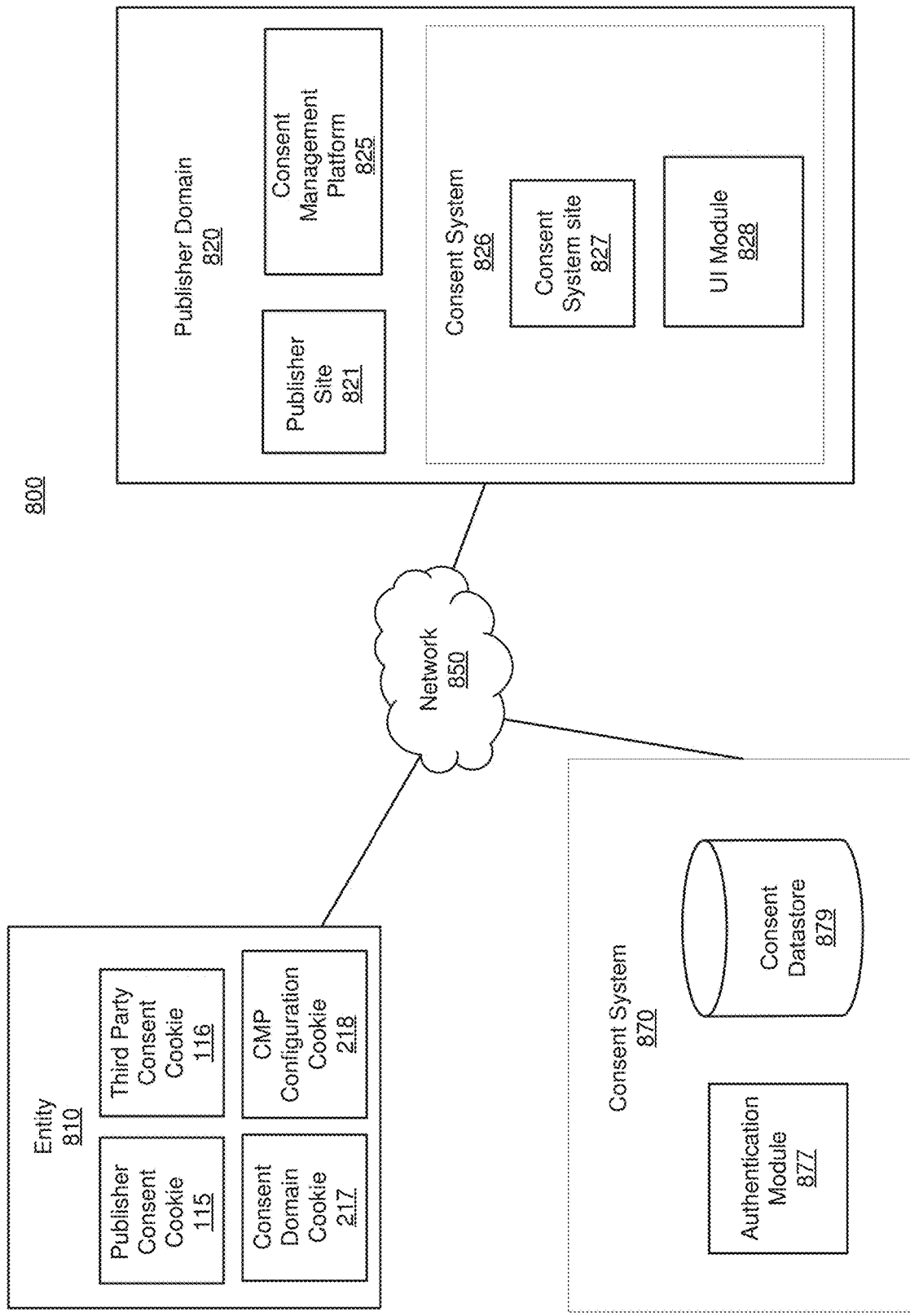
FIG. 8 illustrates an example consent system computing environment, in accordance with another embodiment of the invention.

FIG. 8 illustrates an example computing environment in accordance with an embodiment of the invention. In this embodiment, FIG. 8 illustrates the example computing environment shown in FIG. 2, except some aspects of the consent system 826 are integrated into the publisher domain 220, and others are on a separate and independent consent domain 870. As shown in FIG. 8, computing environment 800 comprises entity 810, publisher domain 820, and consent domain 870. These elements are connected by communication network 850, such as a local area network, a wide area network, a wireless network, an intranet, a cable network, a satellite network, a cellular phone network, an optical network, the Internet, or combinations thereof. Computing environment 800 may include more, fewer, and/or different elements than the ones shown in FIG. 8. Moreover, the functionalities can be distributed among the elements in a different manner than described here.

Entity 810 corresponds to entity 210 as described with respect to FIG. 2 above. Entity 810 comprises publisher consent cookie 115, third party consent cookie 116, consent domain cookie 217, and CMP configuration cookie 218, as described above with respect to FIG. 2. A user of entity 810 will be referred to as "consumer 810." Entity 810 may include more, fewer, and/or different elements than the ones shown in FIG. 8. Moreover, the functionalities can be distributed among the elements in a different manner than described here.

Publisher domain 820 corresponds to publisher domain 220 as described with respect to FIG. 2 above. Publisher domain 820 comprises publisher site 821, consent management platform ("CMP") 825, and consent system 826. A user of publisher domain 820 may be a domain manager, site manager, or a manager of other resources at publisher domain 180. A user of publisher domain 820 will be referred to as "publisher 820." Publisher domain 820 may include more, fewer, and/or different elements than the ones shown in FIG. 8. Moreover, the functionalities can be distributed among the elements in a different manner than described here.

When entity 810 visits publisher site 821, entity 110 executes publisher site 821 software, as described with reference to publisher site 221 above. Although only one publisher site 821 is shown in FIG. 8 for clarity, publisher domain 180 may contain any number of sites.

CMP 825 corresponds to CMP 225, as described with respect to FIG. 2 above. CMP 825 comprises software integrated into publisher site 821 software, as described with respect to CMP 225 above. When entity 810 visits publisher site 821, entity 810 executes publisher site 821 software, including executing CMP 825, as described with respect to CMP 225 above.

Consent system 826 corresponds to consent system 270 as described with respect to FIG. 2 above. Consent system 826 comprises consent system site 827 and UI module 828. Consent domain 870 may include more, fewer, and/or different elements than the ones shown in FIG. 8. Moreover, the functionalities can be distributed among the elements in a different manner than described here.

Consent system site 827 corresponds to consent system site 272 as described with respect to FIG. 2 above. When entity 810, consumer 810, or publisher 820 visits or accesses consent system site 827, entity 810 or the entity (e.g. web browser, mobile application) corresponding to the publisher 820 executes software corresponding to consent system site 827 (e.g., HTML, JavaScript), which may include executing software associated with user interface module 828 ("UI module 828") and authentication module 829 as described with respect to consent system site 272 above.

UI module corresponds to UI module 274 as described with respect to FIG. 2 above. UI Module 828 comprises code that may execute when entity 810, consumer 810, or publisher 820 visits consent system site 827, as described with respect to UI module 828 above.

Consent domain 870 corresponds to consent domain 270 as described with reference to FIG. 2 above. Consent domain 870 comprises authentication module 877 and consent datastore 879. Consent domain 870 may include more, fewer, and/or different elements than the ones shown in FIG. 8. Moreover, the functionalities can be distributed among the elements in a different manner than described here.

Authentication module 877 corresponds to authentication module 277 as described with respect to FIG. 2 above. Authentication module 877 comprises code that may execute when entity 810, consumer 810, or publisher 820 visits consent system site 827, as described above with respect to authentication module 277.

Consent datastore 879 corresponds to consent datastore 279 as described with reference to FIG. 2 above.

In this embodiment, a methods for enabling consumer 210 to save consent choices when entity 810 visits publisher site 821 executes as described with respect to FIGS. 3-4, with the following changes:

When CMP 825 redirects entity 210 to consent system site 827 at steps 309 and 310 (to save consent choices as a consent domain cookie 217), and at steps 404 and 405 (to check and access valid consent domain cookie 217 exists in entity 810), entity 810 does not redirect to separate and independent consent domain 870. Instead, entity 210 redirects to a consent system site 827 in publisher domain 820. For example, consent system site 827 may be a sub-site of publisher site 821, such as www.publishersite821.com/consentsystemsite827. Advantageously, redirecting to a site within publisher domain 820 may be faster than redirecting to consent domain 870. Leaving publisher domain 820 may cause confusion or concern for consumer 810. Advantageously, redirecting to a site within publisher domain 820 enables entity 810 to stay in publisher domain 820, reducing the likelihood of confusion or concern by entity 810. Leaving publisher domain 820 may cause entity 810 to go to a different publisher site (i.e., not publisher site 821), which may cause publisher 820 to lose revenue (e.g., entity 810 may not return to publisher site 821 to view ads or purchase items. Advantageously, redirecting to a site within publisher domain 820 enables entity 810 to stay in publisher domain 820, reducing the likelihood of entity 810 moving to a different publisher site. When entity 810 leaves and returns to publisher site 821, publisher site 821 analytics tools may count them as two distinct visits, corrupting publisher 820 site data. Advantageously, redirecting to a site within publisher domain 820 enables entity 810 to stay in publisher domain 820 and be counted as one unique visit.

In alternate embodiments of the invention described above with reference to FIGS. 3,4,5, and 8, publisher 220/820 may share/access information to consent system 270/870 by means other than consent system site 272/872 URL, and consent system 270/870 may share/access information to publisher 220 by means other than publisher site URL 221/821.

In one embodiment, consumer 210/810 may install a consent system 270/870 plugin in entity 210/810 or publisher 220/820 may install consent system 270/870 API in publisher site 221/821. In this embodiment, CMP 225/825 requests permission from consumer 210/810 to store consumer 210/810 consent choices in the system 270/870 plugin in entity or consent system 270/870 API, similar to requesting permissions as described above with reference to FIGS. 3,4,5, and 8. Consent system 270/870 stores consumer 210/810 consent choices in the he system 270/870 plugin in entity or consent system 270/870 API after receiving the consumer 210/810 consent choices, similar to saving consent choices as described above with reference to FIGS. 3,4,5, and 8. When entity 210/810 visits publisher site 221/821, publisher 220/820 can retrieve the consumer 210/810 consent choices from the he system 270/870 plugin in entity or consent system 270/870 API, without requiring consumer 210/810 to view an additional popup UI or make additional selections corresponding to consent choices. Advantageously, this provides additional options for consumer 210/810 to save consent choices, additional options for publisher 220/820 to retrieve consumer 210/810 consent choices, and enables publisher 220/820 to retrieve consent choices without requiring consumer 210/810 to view an additional popup UI or make additional selections corresponding to consent choices.

In another embodiment, consent system 270/870 may share consumer 210/810 consent choices by sending a link to publisher 220/820. Consent system 270/870 may send the link to publisher 220/820, in one example, in a URL parameter, or, in another example, consent system 270/870 may provide the link as a JSON function. Publisher 220/820 may retrieve consumer 210/810 consent choices by using the link. Consumer 210/810 consent choices may be stored in consent system datastore 279/879. Consumer 210/810 consent choices may be stored in another database, for example on publisher 220/820 domain or on another domain. Advantageously, this provides additional options for publisher 220/820 to retrieve consumer 210/810 consent choices without requiring consumer 210/810 to view an additional popup UI or make additional selections corresponding to consent choices. Advantageously, this may provide publisher 220/820 with an option to retrieve consumer 210/810 without entity 210/810 leaving the publisher site 221/821 and/or publisher 220/820 domain.

Figure 9:
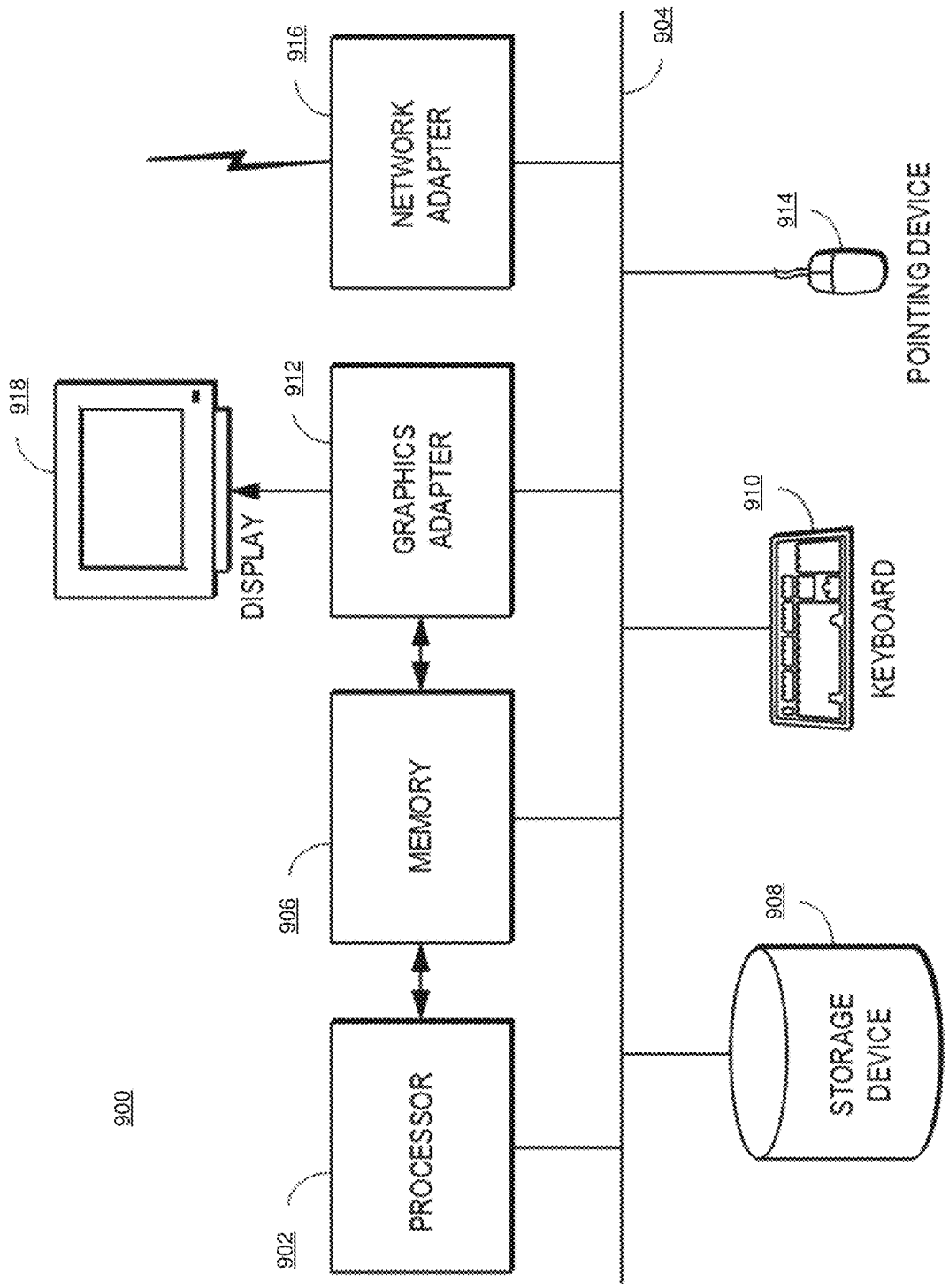
FIG. 9 is a high-level block diagram illustrating an example of a computer for use as entity 210, publisher domain 220, consent system 270, and/or network 250 of FIG. 2, and entity 810, publisher domain 820, consent system 870, and/or network 850 of FIG. 8.

FIG. 9 is a high-level block diagram illustrating an example of a computer for use as entity 210, publisher domain 220, consent system 270, and/or network 250 of FIG. 2, and entity 810, publisher domain 820, consent system 870, and/or network 850 of FIG. 8. Illustrated are a processor 902 coupled to a bus 1104. Also coupled to the bus 1104 are a memory 906, a storage device 908, a keyboard 910, a graphics adapter 916, an input device 914, and a network adapter 1116. A display 918 is coupled to the graphics adapter 612.

Computer 900 comprises a processor 902 which may be any general-purpose processor. The storage device 908 is, in one embodiment, a hard disk drive but can also be any other device capable of storing data, such as a writeable compact disk (CD) or DVD, or a solid-state memory device. The memory 906 may be, for example, firmware, read-only memory (ROM), non-volatile random access memory (NVRAM), and/or RAM, and holds instructions and data used by the processor 902. The input device 914 may be a mouse, track ball, stylus, touchscreen, or other type of input device, and is used in combination with the keyboard 910 to input data into the computer 900. The graphics adapter 916 displays images and other information on the display 918. The network adapter 1117 couples the computer 900 to the network (not shown). In one embodiment, the network is the Internet. The network can also utilize dedicated or private communications links that are not necessarily part of the Internet.

As is known in the art, computer 900 is adapted to execute computer program modules. As used herein, the term "module" refers to computer program logic and/or data for providing the specified functionality. A module can be implemented in hardware, firmware, and/or software. In one embodiment, the modules are stored on the storage device 908, loaded into the memory 906, and executed by the processor 902. Computer 900 is configured to perform the specific functions and operations by various modules, for example as detailed in FIGS. 1, 2, and 8, and thereby operates as a particular computer under such program control. The types of computers 900 utilized by the entities of FIGS. 1, 2, and 8 can vary depending upon the embodiment and the processing power utilized by the entity.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes." "including." "has." "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

The invention claimed is:

1. A method, comprising:
  prior to receiving, by a consent system on a first domain, wherein the first domain does not comprise a media channel which provides content to a browser, a first browser redirect of a browser from a publisher site on a second domain, wherein the publisher site comprises a media channel which provides content to the browser:
    receiving, by the consent system, a consumer consent choice; and
    saving, by the consent system, the consumer consent choice in a first-party consent cookie in the browser;
  receiving, by the consent system, the first browser redirect of the browser from the publisher site;
  retrieving, by the consent system, the consumer consent choice from the consent system first-party consent cookie; and
  redirecting, by the consent system, the browser to the publisher site, based on a publisher uniform resource locator ("URL") corresponding to the publisher site, wherein the publisher URL contains the consumer consent choice.

2. The method of claim 1, wherein the consumer consent choice corresponds to a consumer operating the browser.

3. The method of claim 1, wherein receiving, by the consent system, the consumer consent choice comprises:
  receiving, by the consent system, a second browser redirect of the browser from the publisher site based on a consent system URL corresponding to the consent system, wherein the consent system URL contains the consumer consent choice.

4. The method of claim 1, wherein receiving the consumer consent choice comprises:
  receiving, by the consent system, the browser, wherein the browser directly accesses the consent system; and
  receiving the consumer consent choice, by the consent system, in a consent system interactive user interface.

5. The method of claim 1, wherein saving the consumer consent choice in the first-party consent cookie in the browser further comprises saving the consumer consent choice in a datastore.

6. The method of claim 5, further comprising:
  receiving, by the consent system, a third browser redirect of the browser from a second publisher site on a third domain;
  retrieving, by the consent system, the consumer consent choice from the datastore; and
  redirecting, by the consent system, the browser to the second publisher site, based on a second publisher URL corresponding to the second publisher site, wherein the second publisher URL contains the consumer consent choice.

7. The method of claim 6, wherein retrieving the consumer consent choice from the datastore further comprises saving the consumer consent choice in a second first-party consent cookie in the browser.

8. A non-transitory computer-readable storage medium storing processor-executable computer program instructions that, when executed, cause a computer processor to perform a method, the method comprising:
  prior to receiving, by a consent system on a first domain, wherein the first domain does not comprise a media channel which provides content to a browser, a first browser redirect of a browser from a publisher site on a second domain, wherein the publisher site comprises a media channel which provides content to the browser:

receiving, by the consent system, a consumer consent choice; and saving, by the consent system, the consumer consent choice in a first-party consent cookie in the browser;

receiving, by the consent system, the first browser redirect of the browser from the publisher site;

retrieving, by the consent system, the consumer consent choice from the consent system first-party consent cookie; and redirecting, by the consent system, the browser to the publisher site, based on a publisher uniform resource locator ("URL") corresponding to the publisher site, wherein the publisher URL contains the consumer consent choice;

wherein the publisher URL contains the consumer consent choice.

9. The medium of claim 8, wherein the consumer consent choice corresponds to a consumer operating the browser.

10. The medium of claim 8, wherein receiving, by the consent system, the consumer consent choice comprises:

receiving, by the consent system, a second browser redirect of the browser from the publisher site based on a consent system URL corresponding to the consent system, wherein the consent system URL contains the consumer consent choice.

11. The medium of claim 8, wherein receiving the consumer consent choice comprises:

receiving, by the consent system, the browser, wherein the browser directly accesses the consent system; and receiving the consumer consent choice, by the consent system, in a consent system interactive user interface.

12. The medium of claim 8, wherein saving the consumer consent choice in the first-party consent cookie in the browser further comprises saving the consumer consent choice in a datastore.

13. The medium of claim 12, the method further comprising:

receiving, by the consent system, a third browser redirect of the browser from a second publisher site on a third domain;

retrieving, by the consent system, the consumer consent choice from the datastore; and redirecting, by the consent system, the browser to the second publisher site, based on a second publisher URL corresponding to the second publisher site, wherein the second publisher URL contains the consumer consent choice.

14. The medium of claim 13, wherein retrieving the consumer consent choice from the datastore further comprises saving the consumer consent choice in a second first-party consent cookie in the browser.

15. A consent system on a first domain, comprising:

a processor; and a non-transitory computer-readable storage medium storing processor-executable computer program instructions that, when executed, cause a computer processor to perform a method, the method comprising:

prior to receiving, by a consent system on a first domain, wherein the first domain does not comprise a media channel which provides content to a browser, a first browser redirect of a browser from a publisher site on a second domain, wherein the publisher site comprises a media channel which provides content to the browser:

receiving, by the consent system on a first domain, a consumer consent choice;

saving, by the consent system, the consumer consent choice in a first-party consent cookie in the browser; and receiving, by the consent system, the first browser redirect of the browser redirected from the publisher site on a second domain;

retrieving, by the consent system, the consumer consent choice from the consent system first-party consent cookie; and redirecting, by the consent system, the browser to the publisher site, based on a publisher uniform resource locator ("URL") corresponding to the publisher site, wherein the publisher URL contains the consumer consent choice.

16. The system of claim 15, wherein the consumer consent choice corresponds to a consumer operating the browser.

17. The system of claim 15, wherein receiving, by the consent system, the consumer consent choice comprises:

receiving, by the consent system, a second browser redirect of the browser from the publisher site based on a consent system URL corresponding to the consent system, wherein the consent system URL contains the consumer consent choice.

18. The system of claim 15, wherein receiving the consumer consent choice comprises:

receiving, by the consent system, the browser, wherein the browser directly accesses the consent system; and receiving the consumer consent choice, by the consent system, in a consent system interactive user interface.

19. The system of claim 15, wherein saving the consumer consent choice in the first-party consent cookie in the browser further comprises saving the consumer consent choice in a datastore.

20. The system of claim 19, the method further comprising:

receiving, by the consent system, a third browser redirect of the browser from a second publisher site on a third domain;

retrieving, by the consent system, the consumer consent choice from the datastore; and redirecting, by the consent system, the browser to the second publisher site, based on a second publisher URL corresponding to the second publisher site, wherein the second publisher URL contains the consumer consent choice.

21. The system of claim 20, wherein retrieving the consumer consent choice from the datastore further comprises saving the consumer consent choice in a second first-party consent cookie in the browser.

* * * * *